(12) United States Patent
Baek et al.

(10) Patent No.: US 10,089,746 B2
(45) Date of Patent: Oct. 2, 2018

(54) MOTION DETECTION SYSTEM AND METHOD

(71) Applicant: HANWHA TECHWIN CO., LTD., Changwon-si (KR)

(72) Inventors: Young Min Baek, Changwon-si (KR); Jeong Eun Lim, Changwon-si (KR); Jik Han Jung, Changwon-si (KR); Ji Sung Kim, Changwon-si (KR)

(73) Assignees: Hanwha Techwin Co., Ltd., Changwon-si (KR); HANWHA LAND SYSTEMS CO., LTD., Changwon-si (KR)

( * ) Notice: Subject to any disclaimer, the term of this patent is extended or adjusted under 35 U.S.C. 154(b) by 587 days.

(21) Appl. No.: 14/282,213

(22) Filed: May 20, 2014

(65) Prior Publication Data

US 2015/0146932 A1     May 28, 2015

(30) Foreign Application Priority Data

Nov. 25, 2013 (KR) .................. 10-2013-0143934

(51) Int. Cl.
*G06K 9/00* (2006.01)
*G06T 7/254* (2017.01)

(52) U.S. Cl.
CPC .... *G06T 7/254* (2017.01); *G06T 2207/10016* (2013.01); *G06T 2207/20036* (2013.01); *G06T 2207/30232* (2013.01)

(58) Field of Classification Search
None
See application file for complete search history.

(56) References Cited

U.S. PATENT DOCUMENTS

| | | | |
|---|---|---|---|
| 7,684,486 B2 | 3/2010 | Ha | |
| 7,929,613 B2 | 4/2011 | Kamijo et al. | |
| 7,978,917 B2* | 7/2011 | Lei | G06K 9/00771 375/240.08 |
| 9,251,573 B2* | 2/2016 | Kobayashi | G06T 5/009 |

(Continued)

FOREIGN PATENT DOCUMENTS

| | | |
|---|---|---|
| CN | 101084527 A | 12/2007 |
| CN | 101739686 A | 6/2010 |

(Continued)

OTHER PUBLICATIONS

Mei Xiao et al., "Background Subtraction Algorithm Based on Online Clustering", Pattern Recognition and Artificial Intelligence, vol. 20, No. 1, Feb. 2007, pp. 35-41. (7 pages total).

(Continued)

*Primary Examiner* — Nancy Bitar
(74) *Attorney, Agent, or Firm* — Sughrue Mion, PLLC (57) ABSTRACT

Provided are a motion detection system and method. The motion detection system includes a pixel-based detector configured to compare a previous frame and a present frame to extract pixel constituting a first foreground region, a region-based detector configured to extract a second foreground region based on peripheral pixels of a pixel to be inspected, and a motion determiner configured to detect, as a final motion region among pixel groups of the first foreground region, a pixel group comprising pixels corresponding to the second foreground region.

14 Claims, 8 Drawing Sheets

(56) References Cited

U.S. PATENT DOCUMENTS

| | | | |
|---|---|---|---|
| 2004/0090523 A1* | 5/2004 | Kondo | H04N 13/0018 348/46 |
| 2004/0210159 A1* | 10/2004 | Kibar | A61B 5/4803 600/558 |
| 2009/0284627 A1* | 11/2009 | Bando | G06K 9/00201 348/273 |
| 2010/0054592 A1* | 3/2010 | Nanu | G06T 5/008 382/167 |
| 2010/0165129 A1* | 7/2010 | Kondo | G06T 5/50 348/208.4 |
| 2011/0157392 A1 | 6/2011 | Chou et al. | |
| 2012/0125386 A1* | 5/2012 | Bertolucci | B08B 3/026 134/58 R |
| 2014/0321748 A1* | 10/2014 | Ruan | G06T 7/0081 382/180 |

FOREIGN PATENT DOCUMENTS

| | | |
|---|---|---|
| JP | 2008-518344 A | 5/2008 |
| KR | 10-2005-0080862 A | 8/2005 |
| KR | 10-2007-0065418 A | 6/2007 |
| KR | 10-1067516 B1 | 9/2011 |

OTHER PUBLICATIONS

Office Action dated Jun. 5, 2018 by the State Intellectual Property Office of P.R. China in counterpart Chinese Patent Application No. 201410425393.0.

\* cited by examiner

MOTION DETECTION SYSTEM AND METHOD

CROSS-REFERENCE TO RELATED APPLICATION(S)

This application claims priority from Korean Patent Application No. 10-2013-0143934, filed on Nov. 25, 2013, in the Korean Intellectual Property Office, the disclosure of which is incorporated herein by reference in its entirety.

BACKGROUND

1. Field

Apparatuses and methods consistent with exemplary embodiments relate to motion detection, and more particularly, to motion detection in which a dynamic background is effectively removed by combining a pixel-based motion detection method and a region-based motion detection method.

2. Description of the Related Art

In recent years, there has been an increased demand for monitoring systems for various purposes. In the case of a general monitoring system of the related art, a camera is installed in a region to be monitored and monitoring is performed by an observer who watches camera images displayed on a monitor. However, this method increases personnel expenses and a monitoring range is quite limited. Thus, various attempts to automatically detect a desired foreground in a monitoring region have been made.

In general, a foreground to be detected in a monitoring region is a portion of an image, other than a background, in which an event occurs. For example, a moving object may be representatively detected as a foreground. In the related art, a previous frame and a present frame are compared with each other in a moving image, and a moving object is detected as a foreground.

SUMMARY

Exemplary embodiments address at least the above problems and/or disadvantages and other disadvantages not described above. Also, exemplary embodiments are not required to overcome the disadvantages described above, and an exemplary embodiment may not overcome any of the problems described above.

One or more exemplary embodiments include a motion detection method capable of exactly obtaining a region of a moving object and excluding noise and a dynamic background.

One or more exemplary embodiments include a motion detection method combining a pixel-based detection method and a region-based detection method.

Additional aspects will be set forth in part in the description which follows and, in part, will be apparent from the description, or may be learned by practice of the presented embodiments.

According to an aspect of an exemplary embodiment, there is provided a motion detection system including: a pixel-based detector configured to compare a previous frame and a present frame to extract pixels constituting a first foreground region; a region-based detector configured to extract a second foreground region based on peripheral pixels of a pixel to be inspected; and a motion determiner configured to detect, as a final motion region among pixel groups of the first foreground region, a pixel group including pixels corresponding to the second foreground region.

The motion determiner may be further configured to select a pixel group among the pixel groups of the first foreground region based on an identification number and may determine whether pixels corresponding to the second foreground region are included in the selected pixel group.

The pixel groups of the first foreground region may include at least one pixel group in which adjacent pixels of the first foreground region are grouped and assigned an identification number.

The motion determiner may be further configured to select, as the final motion region among the pixels groups of the first foreground region, the pixel group including the pixels corresponding to the second foreground region, and remove a pixel group among the pixel groups of the first foreground region not including pixels corresponding to the second foreground region from the final motion region.

The pixel-based detector may include: a first foreground detector configured to detect the first foreground region by using a background difference image technique; and a labeler configured to group pixels which are adjacent to each other among the pixels constituting the first foreground region into a plurality of pixel groups and assign an identification number to each of the plurality of pixel groups.

The pixel-based detector may further include: a noise remover configured to remove noise formed by a pixel group in which a number of pixels is equal to or less than a reference number, among the plurality of pixel groups, by applying a filter to the first foreground region; and an expander configured to expand a size of a foreground of the first foreground region through morphology dilation.

The region-based detector may include: a limit luminance detector configured to detect a peripheral upper limit luminance and a peripheral lower limit luminance in a corresponding peripheral region of a background modeling image corresponding to a peripheral region of the pixel to be inspected; and a second foreground detector configured to determine whether the pixel to be inspected corresponds to the second foreground region, based on a luminance of the pixel to be inspected and a result of a comparison of the luminance of the pixel to be inspected to the peripheral upper limit luminance and the peripheral lower limit luminance.

In response to a value of the luminance of the pixel to be inspected being between the peripheral upper limit luminance and the peripheral lower limit luminance, the pixel to be inspected may be determined to be a background pixel. In response to the value of the luminance of the pixel to be inspected exceeding a threshold value, the pixel to be inspected may be determined to be a pixel of the second foreground region.

According to an aspect of another exemplary embodiment, there is provided a motion detection method including: comparing a previous frame and a present frame to extract pixels constituting a first foreground region; extracting a second foreground region based on peripheral pixels of a pixel to be inspected; and detecting, as a final motion region among pixel groups of the first foreground region, a pixel group including pixels corresponding to the second foreground region.

The detecting of the pixel group may include selecting a pixel group among the pixel groups of the first foreground region based on an identification number, and determining whether pixels corresponding to the second foreground region are included in the selected pixel group.

The pixel groups of the first foreground region may be configured as at least one pixel group in which adjacent pixels of the first foreground region are grouped and assigned an identification number.

The detecting of the pixel group may include selecting, as a final motion region among the pixels groups of the first foreground region, the pixel group including the pixels corresponding to the second foreground region, and removing a pixel group among the pixel groups of the first foreground region not including pixels corresponding to the second foreground region from the final motion region.

The comparing of pixels may include: detecting the first foreground region using a background difference image technique, and grouping pixels which are adjacent to each other among the pixels constituting the first foreground region into a plurality of pixel groups and assigning an identification number to each of the plurality of pixel groups.

The comparing of pixels may further include: removing noise formed by a pixel group in which a number of pixels is equal to or less than a reference number, among the plurality of pixel groups, by applying a filter to the first foreground region, to correct the first foreground region, and expanding a size of a foreground of the first foreground region through morphology dilation.

The extracting of a second foreground region may include: detecting a peripheral upper limit luminance and a peripheral lower limit luminance in a corresponding peripheral region of a background modeling image corresponding to a peripheral region of the pixel to be inspected, and determining whether the pixel to be inspected corresponds to the second foreground region, based on a luminance of the pixel to be inspected and a result of a comparison of the luminance of the pixel to be inspected to the peripheral upper limit luminance and the peripheral lower limit luminance.

In the determining of whether the pixel to be inspected corresponds to the second foreground region, in response to a value of the luminance of the pixel to be inspected being between the peripheral upper limit luminance and the peripheral lower limit luminance, the pixel to be inspected may be determined to be a background pixel, and in response to the value of the luminance of the pixel to be inspected exceeding a threshold value, the pixel to be inspected may be determined to be a pixel of the second foreground region.

According to an aspect of another exemplary embodiment, there is provided a non-transitory computer readable medium having recorded thereon a program, which when executed by a computer, causes the computer to execute a method including: detecting a pixel-based foreground region by comparing a current image frame and a previous image frame; detecting a region-based foreground region by setting a pixel to be inspected and determining whether the selected pixel is included in the region-based foreground region, based on peripheral pixels of the selected pixel; and selecting a final motion region by comparing the pixel-based foreground region and the region-based foreground region.

The comparing the current image frame and the previous image frame may include using a background difference image technique.

The detecting the region-based foreground region may include: detecting a peripheral upper limit luminance and a peripheral lower limit luminance among the peripheral pixels of the selected pixel; and determining whether the selected pixel corresponds to the region-based foreground region by comparing a luminance of the selected pixel with the peripheral upper limit luminance and the peripheral lower limit luminance.

BRIEF DESCRIPTION OF THE DRAWINGS

The above and/or other aspects will become apparent and more readily appreciated from the following description of the exemplary embodiments, taken in conjunction with the accompanying drawings in which.

DETAILED DESCRIPTION OF EXEMPLARY EMBODIMENTS

Certain exemplary embodiments will now be described more fully with reference to the accompanying drawings The matters defined in the specification, such as detailed construction and elements, are provided to assist in a comprehensive understanding of the exemplary embodiments. Thus, it is apparent that the exemplary embodiments can be carried out without those specifically defined matters. It should be understood that the exemplary embodiments may vary but do not have to be mutually exclusive. For example, particular shapes, structures, and properties according to a predetermined exemplary embodiment described in this specification may be modified by other exemplary embodiments without departing from the spirit and scope of the inventive concept, as defined by the appended claims. In addition, positions or arrangement of individual components of each of the exemplary embodiments may also be modified without departing from the spirit and scope of the inventive concept, as defined by the appended claims. Accordingly, the detailed description below should not be construed as having limited meanings but construed to encompass the scope of the claims and any equivalent ranges thereto. In the drawings, like reference numerals denote like elements in various aspects.

Figure 1:
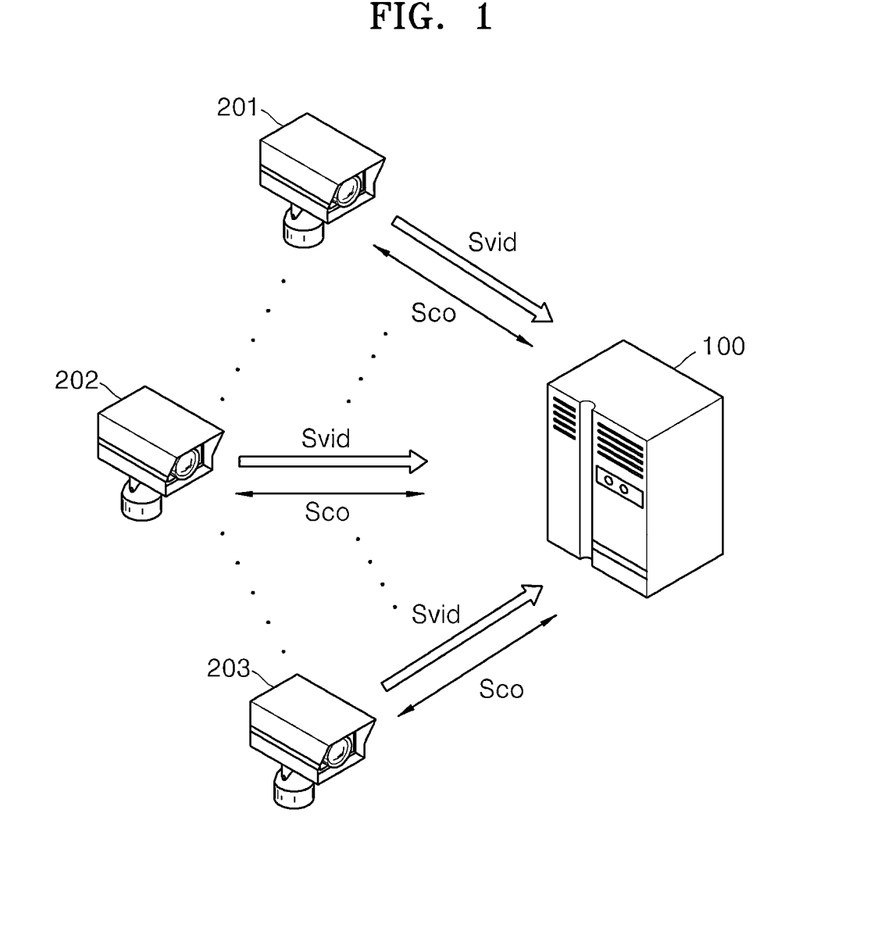
FIG. 1 is a diagram illustrating a configuration of a motion detection system according to an exemplary embodiment.

FIG. 1 is a diagram illustrating a configuration of a motion detection system according to an exemplary embodiment.

Referring to FIG. 1, monitoring cameras 201 to 203 communicate with a motion detection server 100. That is, the monitoring cameras 201 and 203 exchange communication signals Sco with the motion detection server 100 and also transmit a video signal Svid of a live-view image to the motion detection server 100.

For example, each of the monitoring cameras 201 to 203 communicates with the motion detection server 100 through a coaxial cable, and transmits the video signal Svid to the motion detection server 100. Thus, communication signals Dcom are transmitted and received in a vertical blank interval of the video signal Svid transmitted to the motion detection server 100. Although FIG. 1 illustrates three monitoring cameras 201 to 203, the number of monitoring cameras may vary according to various modifications of the present disclosure.

The video signal Svid received in the motion detection server 100 is displayed on a display device and is stored in a recording device, for example, a hard disk drive.

In addition, each of the monitoring cameras 201 to 203 may perform panning (a horizontal rotation) and tilting (a vertical rotation) in response to control signals received from the motion detection server 100.

The motion detection server 100 detects a motion according to an exemplary embodiment. In more detail, the motion detection server 100 detects a first foreground region via a pixel-based detection, detects a second foreground region via a region-based detection, and then detects a pixel group including pixels corresponding to the second foreground region as a final motion region in a pixel group of the first foreground region.

Figure 2:
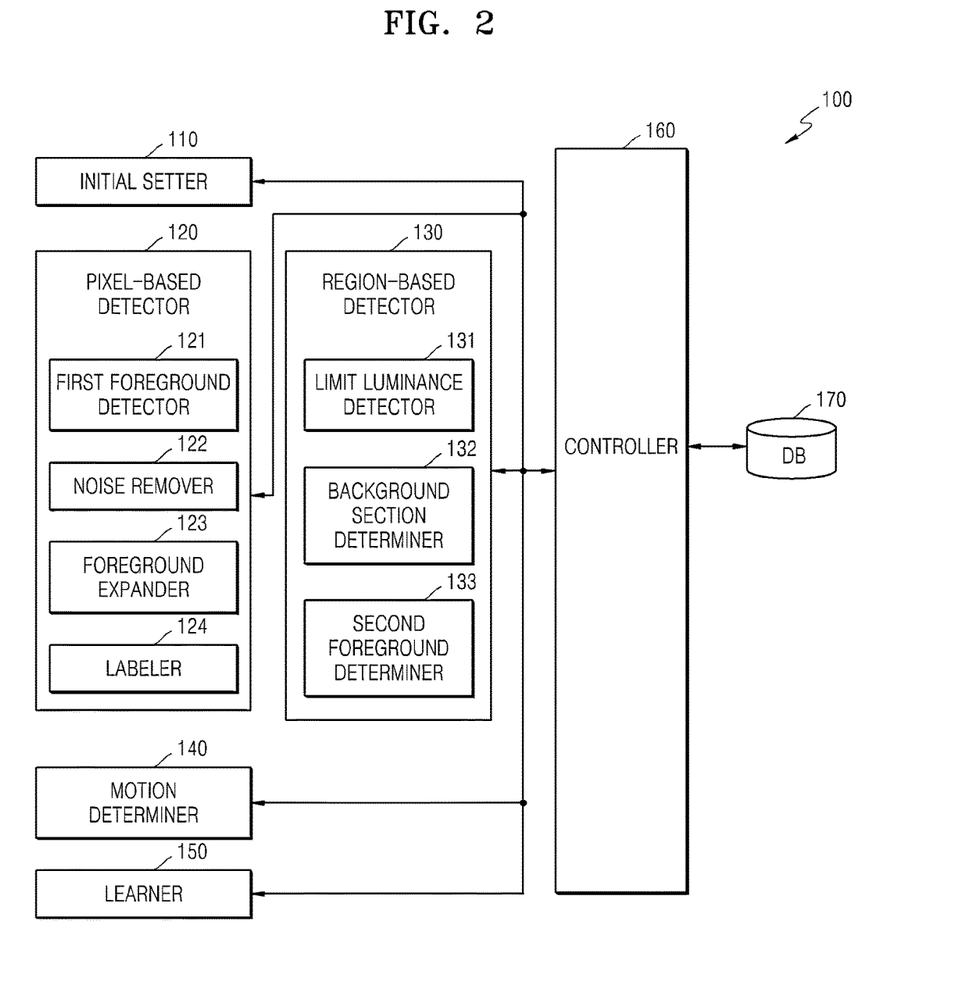
FIG. 2 is a schematic diagram illustrating an internal configuration of a motion detection server according to an exemplary embodiment.

FIG. 2 is a schematic diagram of the motion detection server 100 according to an exemplary embodiment.

The motion detection server 100 according to the current exemplary embodiment includes an initial setter 110, a pixel-based detector 120, a region-based detector 130, a motion determiner 140, a learner 150, a controller 160, and a database 170. In the motion detection server 100, the motion determiner 140 detects, as a final motion region, only a region including pixels detected by the region-based detector 130 among a plurality of motion regions detected by the pixel-based detector 120. In addition, the learner 150 acquires the final motion region output from the motion determiner 140, learns that the acquired final motion region is a background modeling image, and then stores the image in the database 170. The initial setter 110, the pixel-based detector 120, the region-based detector 130, the motion determiner 140, the learner 150, the controller 160, and the database 170 may include at least one of a processor, a hardware module, or a circuit for performing their respective functions.

In addition, the controller 160 controls communication between the initial setter 110, the pixel-based detector 120, the region-based detector 130, the motion determiner 140, the learner 150, and the database 170, and controls the units to smoothly operate. The database 170 may store an image and a background model that are acquired from a monitoring device.

In addition, the pixel-based detector 120 detects a pixel-based foreground, including a dynamic background, in which the shape of a moving object is detected, and also detects a region-based foreground which the region-based detector 130 considers as a peripheral region. Finally, the motion determiner 140 selects, as a final moving object, only a pixel group including the region-based foreground in the pixel-based foreground. Thus, an erroneous detection regarding the dynamic background is reduced, and an original object region is detected.

Figure 3:
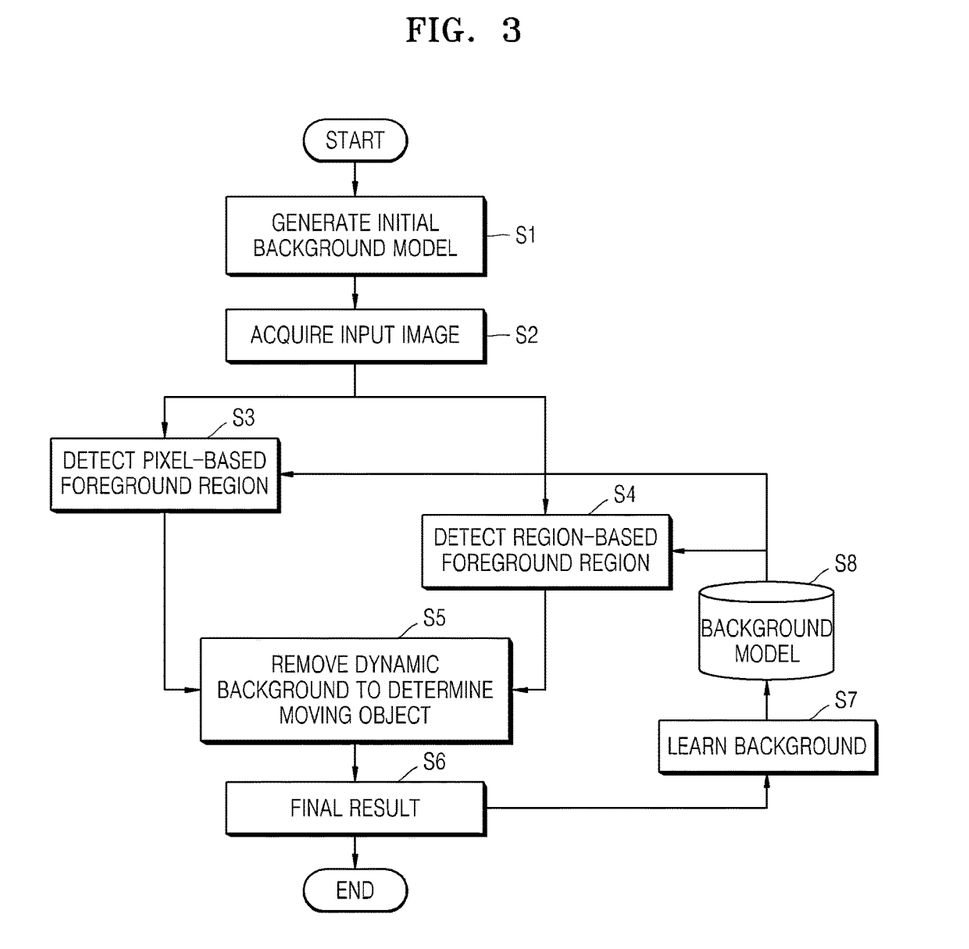
FIG. 3 is a flowchart sequentially illustrating a motion detection method according to an exemplary embodiment.

FIG. 3 is a flowchart illustrating a motion detection method according to an exemplary embodiment.

Referring to FIG. 3, the initial setter 110 generates an initial background model (operation S1). Next, the motion detection server 100 acquires an input image (operation S2).

With respect to the acquired input image, the pixel-based detector 120 detects a pixel-based foreground region (operation S3), and the region-based detector 130 detects a region-based foreground region (operation S4).

Subsequently, the motion determiner 140 removes a dynamic background to determine a final motion region (operation S5), and outputs a final result of selection of the final motion region as a foreground (operation S6).

The learner 150 learns a background region from the final result (operation S7), and stores a background model in the database (operation S8).

Hereinafter, a motion detection method according to an exemplary embodiment will be described on the basis of each configuration of the motion detection server 100.

First, when a first image frame $I^0$ is input, the initial setter 110 copies the first image frame $I^0$ onto a background modeling image as expressed by Equation 1 below to generate a background.

$$BG^0 = I^0 \tag{1}$$

The initial background model excludes a portion, selected as the final foreground, as a foreground, and performs updating through background learning. In this case, $BG^0$ represents a background modeling image in an initial state.

Subsequently, the pixel-based detector 120 models an image in units of pixels to detect a motion region. The pixel-based detector 120 uses a background difference image. That is, the pixel-based detector 120 detects the shape of a moving object by using a pixel-based method. A new image frame that is input from a camera will be represented by $I^t$. The pixel-based detector 120 includes a first foreground detector 121, a noise remover 122, a foreground expander 123, and a labeler 124.

First, the pixel-based detector 120 acquires the input image $I^t$.

Subsequently, the first foreground detector 121 selects a foreground in the image in consideration of a threshold value of a difference image. In more detail, a method of determining, by the pixel-based detector 120, whether one pixel located in the image is a foreground or a background is as follows. A difference image between a background that is presently modeled and the input image is obtained. Then, if the difference value thereof is smaller than a threshold value $Threshold_{pixel}$ for the determination of a foreground, the pixel is determined to be a foreground, and if not, the pixel is determined to be a background. A method of detecting a pixel corresponding to a pixel-based foreground is be expressed by Equation 2 below.

$$\begin{aligned}&\text{If } |I^t(x,y) - BG^t(x,y)| < Threshold_{pixel} \\ &\quad Foreground_{pixel}(x,y) = 255 \\ &\text{Else} \\ &\quad Foreground_{pixel}(x,y) = 0\end{aligned} \tag{2}$$

In Equation 2 above, pixels having a $Foreground_{pixel}(x,y)$ value of 255 and corresponding to (x,y) coordinates are pixels corresponding to the pixel-based foreground and constitute a first foreground region. In the following description, the pixels constituting the first foreground region may be referred to as first foreground pixels.

Next, the noise remover 122 removes noise from the pixels of the first foreground region that is acquired by the first foreground detector 121. When a foreground region is detected using a background difference image technique like that used by the first foreground detector 121, a detection result may include a large amount of noise. Accordingly, in order to remove noise, the noise remover 122 removes noise generated by the number of pixel in a group which is less than a reference number of pixel is a reference group in order to correct the first foreground region. The noise remover 122 may use a median filter for removing noise.

For example, when a single pixel of the first foreground region is detected separately without being connected to pixels of other foreground regions, there is a high probability that the single pixel will be in fact noise. Accordingly, the noise remover 122 determines the single pixel or the number of pixels which is less than a reference number of pixel is a reference group as noise and removes them from the first foreground region.

The foreground expander 123 increases the size of a foreground through morphology dilation.

The labeler 124 assigns an identification number to each pixel group of the pixel-based foreground. As described above, one pixel group refers to a group of adjacent pixels which are grouped among the pixels of the first foreground region.

Figure 7:
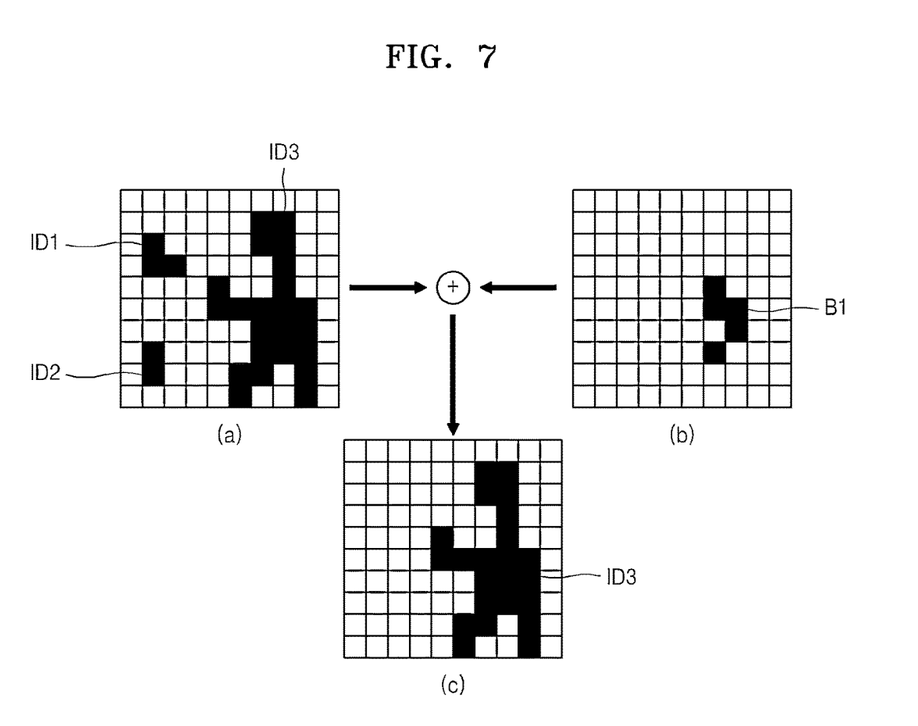
FIG. 7 is a diagram illustrating a method of detecting a final moving object by a combination of pixel-based detection and region-based detection.

(a) of FIG. 7 illustrates a first foreground region detected by the pixel-based detector 120 according to an exemplary embodiment. The image of FIG. 2 has a first foreground region formed by three pixel groups. That is, when adjacent foreground pixels are grouped, three pixel groups may be formed as illustrated in FIG. 2. In addition, the labeler 124 may assign identification numbers such as ID1, ID2, and ID3 to the respective pixel groups.

The pixel-based detector 120 described above may determine a foreground or a background in units of pixels. A motion region detected by the pixel-based detector 120 is referred to as a pixel-based foreground. The pixel-based foreground may detect the whole shape of a moving object. However, there is a high probability that a dynamic background or a minute movement of a camera will be erroneously determined as a foreground. Accordingly, in order to adjust a detection result of the pixel-based detector 120, a region-based model is used. The region-based detector 130 that detects a foreground region using the region-based model will be described below.

The region-based detector 130 sets a pixel peripheral region centering around a pixel to be inspected in order to detect a second foreground region which is a region-based foreground region.

The region-based detector 130 obtains a peripheral upper limit luminance and a peripheral lower limit luminance according to a maximum luminance and a minimum luminance, respectively, in a corresponding peripheral region of a reference background image corresponding to the pixel peripheral region, and then determines whether a pixel to be inspected changes to a pixel of a foreground image based on the luminance of the pixel to be inspected and a result of comparing the luminance of the pixel to the peripheral upper limit luminance and the peripheral lower limit luminance.

When the luminance of the pixel to be inspected changes for a short period of time and is then restored to its original state, there is a high probability that the luminance of the pixel to be inspected will change to be similar to the luminance of peripheral pixels. For example, when leaves of one tree move due to wind, there is a high probability that the luminance of the pixel to be inspected of any one leaf will change to the luminance of another leaf.

That is, when the luminance of the pixel to be inspected changes for a short period of time and is then restored to its original state, there is a high probability that the luminance of the pixel to be inspected will be lower than the peripheral upper limit luminance and higher than the peripheral lower limit luminance.

Accordingly, while the luminance of the pixel to be inspected changes for a short period of time and is then restored to its original state, there is a low probability that the pixel to be inspected will be erroneously determined to be a foreground image. That is, a background image that changes for a short period of time and is then restored to its original state may be prevented from being erroneously determined as a foreground image.

The details thereof will be described below with an emphasis on an internal configuration of the region-based detector 130.

First, a limit luminance detector 131 obtains a peripheral upper limit luminance and a peripheral lower limit luminance based on a maximum luminance and a minimum luminance, respectively, in a corresponding peripheral region of a reference background image.

Regions (u,v) separated by a search width from a location at points (x,y) of a present image may be expressed by Equation 3 below.

$$x-\text{Search Width} \le u \le x+\text{Search Width}$$

$$y-\text{Search Width} \le v \le y+\text{Search Width} \quad (3)$$

Subsequently, the limit luminance detector 131 obtains a maximum luminance value and a minimum luminance value in a background modeling image via Equation 4 below.

$$BG^t_{min}(x,y)=\min(BG(u,v))$$

$$BG^t_{max}(x,y)=\max(BG(u,v)) \quad (4)$$

Subsequently, a background section determiner 132 determines a section that is determined to be a background based on $BG^t_{min}(x,y)$ and $BG^t_{max}(x,y)$ that are obtained using Equation 4. If a luminance value of a pixel to be inspected ($I^t(x,y)$) enters a background section expressed by Equation 5, it is determined to be a background region.

$$\text{Neighbor}^t_{min}(x,y) \le I^t(x,y) \le \text{Neighbor}^t_{max}(x,y) \quad (5)$$

At this time, a maximum value and a minimum value of the background section may be calculated by Equation 6 below.

$$\text{Neighbor}^t_{min}(x,y)=BG^t_{min}(x,y)-\text{Ratio}*BG^t_{diff}(x,y)$$

$$\text{Neighbor}^t_{max}(x,y)=BG^t_{max}(x,y)+\text{Ratio}*BG^t_{diff}(x,y)$$

In Equation 6 above, a ratio is an experimental value or a weighting that is designated by a user and may be expressed by $BG^t_{diff}(x,y)=BG^t_{max}(x,y)-BG^t_{min}(x,y)$.

Subsequently, a second foreground determiner 133 detects a foreground candidate pixel and finally determines a region-based foreground pixel. If a specific pixel does not enter a background section, there is a high probability that the corresponding pixel will become a foreground pixel, and thus the foreground determiner 133 may calculate a background section difference $\text{Neighbor}_{diff}(x,y)$ as expressed by Equation 7 below.

$$\begin{aligned}
&\text{If } (I^t(x,y) < \text{Neighbor}^t_{min}(x,y)) \\
&\quad \text{Neighbor}_{diff}(x,y) = \text{Neighbor}^t_{min}(x,y) - I^t(x,y) \\
&\text{Else if } (I^t(x,y) > \text{Neighbor}^t_{max}(x,y)) \\
&\quad \text{Neighbor}_{diff}(x,y) = I^t(x,y) - \text{Neighbor}^t_{max}(x,y) \\
&\text{Else} \\
&\quad \text{Neighbor}_{diff}(x,y) = 0
\end{aligned} \quad (7)$$

If the value of $\text{Neighbor}_{diff}(x,y)$ calculated using Equation 7 is larger than a threshold value that is determined by a user, it is determined to be a region foreground expressed by Equation 8 below.

If ( Neighbor$_{diff}$(x,y) > Threshold )   (8)
    Foreground$^r$(x,y) = 255
Else
    Foreground$^r$(x,y) = 0
(wherein, the threshold value is a real number larger than 0)

As described above, a result of the foreground detection of the region-based detector 130 includes very little noise, however, pixels located around an edge of a moving object may not be correctly determined to be a foreground.

Figure 4:
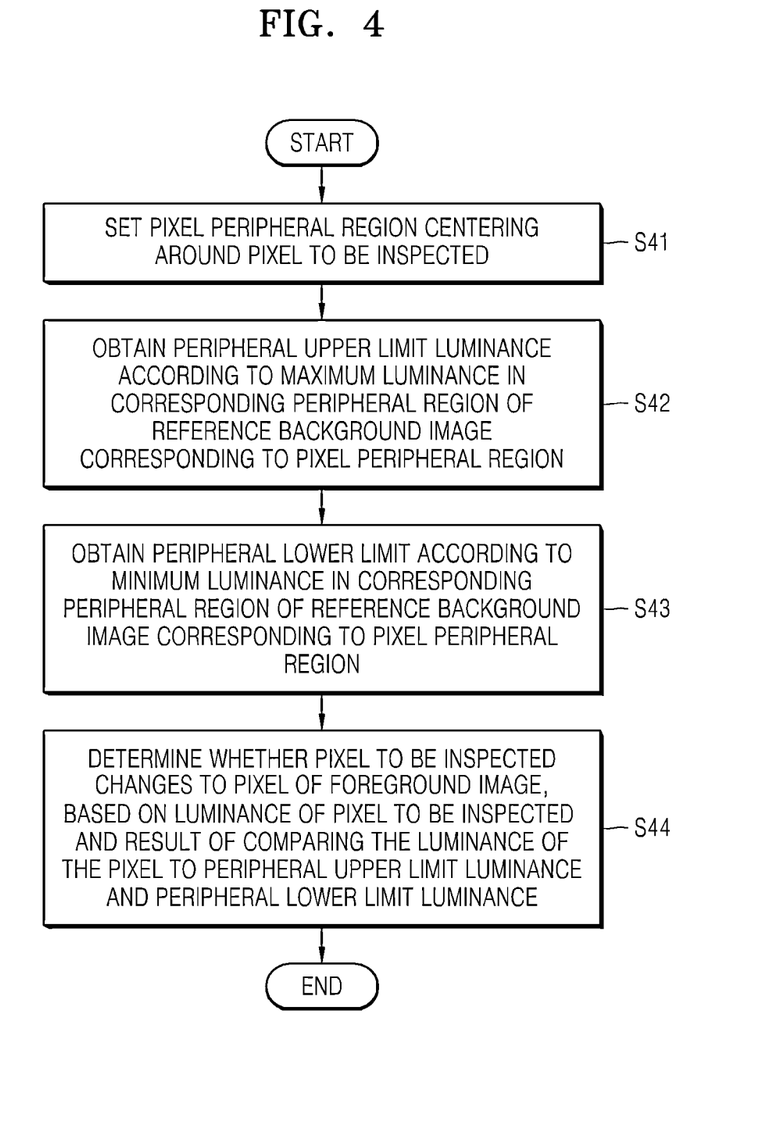
FIG. 4 is a flowchart illustrating a method of detecting a region-based foreground pixel.
Figure 5:
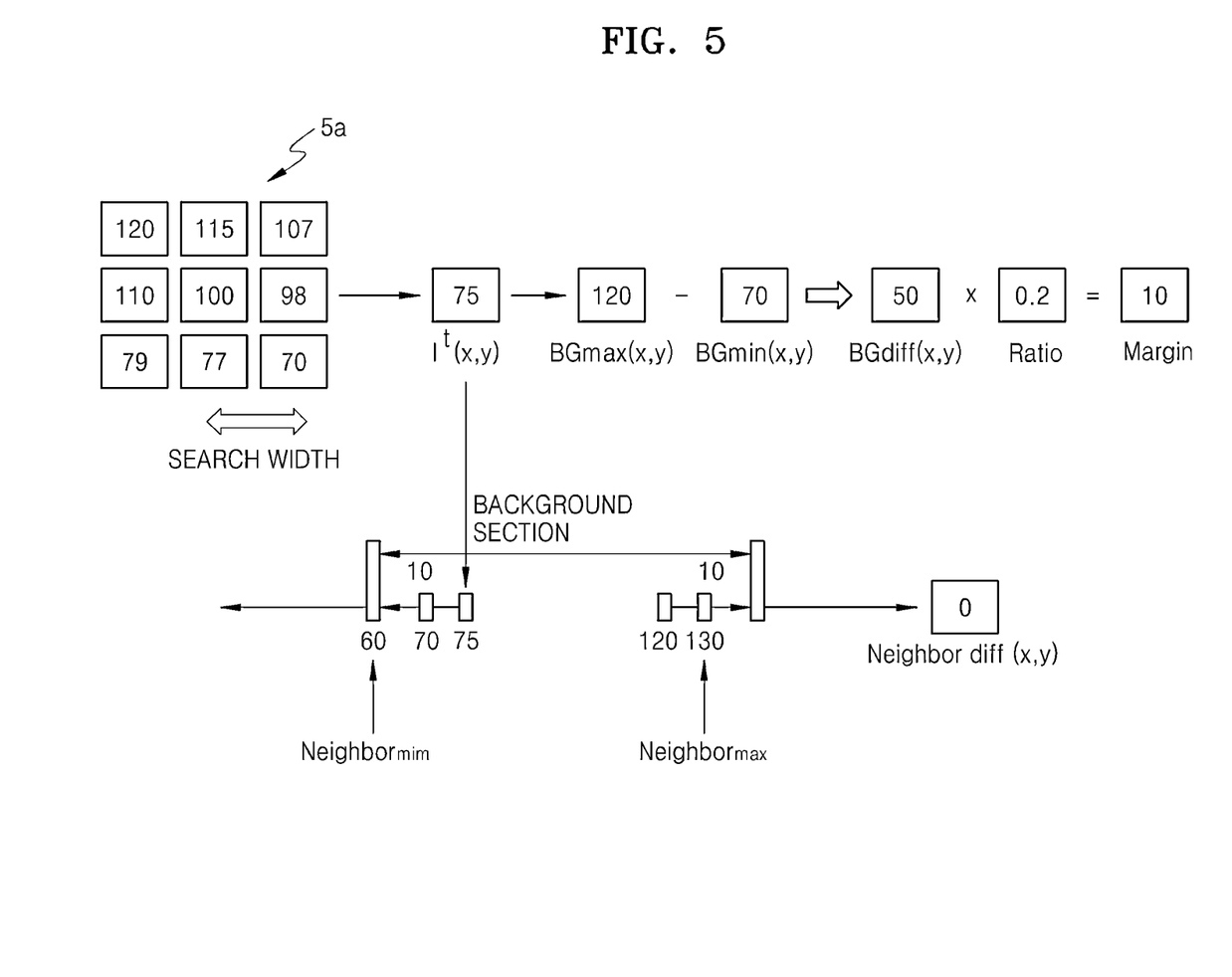
FIG. 5 is a diagram illustrating an example of detection of a region-based foreground pixel.

FIG. 4 is a flowchart illustrating a method of detecting a region-based foreground pixel, and FIG. 5 is a diagram illustrating an example of detection of a region-based foreground pixel.

In more detail, FIG. 4 illustrates a method of detecting a second foreground region according to an exemplary embodiment which is performed in the region-based foreground region detection (S4) operation of FIG. 3. FIG. 5 is a diagram illustrating an example of the foreground detection method of FIG. 4.

The foreground determination method of FIG. 4 will be described below with reference to FIGS. 4 and 5.

The method of FIG. 4 is a foreground determination method performed by the region-based detector 130 to determine whether respective pixels of an input background image change to pixels of a foreground image, and includes operations S41 to S44.

First, a pixel peripheral region centering around a pixel to be inspected (I$^r$(x,y)) is set (operation S41). In the exemplary embodiment of FIG. 5, the luminance of the pixel to be inspected (I$^r$(x,y)) is 75. In addition, a luminance value of a corresponding pixel of a background modeling image corresponding to the pixel to be inspected is 100, and a search width is 1 pixel. In FIG. 5, reference numeral 5a denotes a corresponding peripheral region, and the corresponding peripheral region is a region of a background modeling image corresponding to a pixel peripheral region.

The number of pixels of the corresponding peripheral region 5a is determined by a search width. The search width means the number of pixels that are added to the right from the pixel to be inspected (I$^r$(x,y)). Naturally, the number of pixels added to the right, the number of pixels added to the left, the number of pixels added upwards, and the number of pixels added downward are the same. In FIG. 5, since a search width is 1, the number of pixels of the corresponding peripheral region 5a is 9.

Subsequently, a peripheral upper limit luminance (Neighbor$_{max}$) is obtained based on a maximum luminance (BG$_{max}$(x,y)) in the corresponding peripheral region 5a of the background modeling image corresponding to the pixel peripheral region (operation S42). In the exemplary embodiment of FIG. 5, the maximum luminance (BG$_{max}$(x,y)) in the corresponding peripheral region 5a is 120, and the peripheral upper limit luminance (Neighbor$_{max}$) is 130.

Next, a peripheral lower limit luminance (Neighbor$_{min}$) is obtained based on a minimum luminance (BG$_{min}$(x,y)) in the corresponding peripheral region 5a of the background modeling image corresponding to the pixel peripheral region (operation S43). In the example of FIG. 5, the minimum luminance (BG$_{min}$(x,y)) in the corresponding peripheral region 5a is 70, and the peripheral lower limit luminance (Neighbor$_{min}$) is 60.

In more detail, in the example of FIG. 5, the maximum luminance (BG$_{max}$(x,y)) in the corresponding peripheral region 5a is 120, and the minimum luminance (BG$_{min}$(x,y)) is 70. Accordingly, a luminance difference (BG$_{diff}$(x,y)) is 50, and when a weighting (ratio) is 0.2 in the exemplary embodiment of FIG. 5, a margin which is Ratio*BG$_{diff}$(x,y) is 10.

As described above, the peripheral upper limit luminance (Neighbor$_{max}$) is 130 as obtained by adding a margin to the maximum luminance (BG$_{max}$(x,y)), and the peripheral lower limit luminance (Neighbor$_{min}$) is 60 as obtained by subtracting a margin from the minimum luminance (BG$_{min}$(x,y)).

Finally, it is determined whether the pixel to be inspected (I$^r$(x,y)) changes to a pixel of a foreground image, based on the luminance of the pixel to be inspected (I$^r$(x,y)) and a result of comparing the luminance of the pixel to the peripheral upper limit luminance (Neighbor$_{max}$) and the peripheral lower limit luminance (Neighbor$_{min}$) (operation S44). In the example of FIG. 5, since the luminance of the pixel to be inspected (I$^r$(x,y)) is located at a section between 60 and 130, which is a background section, the pixel to be inspected (I$^r$(x,y)) is determined to be a background.

If the luminance of the pixel to be inspected (I$^r$(x,y)) does not enter the background section, the pixel is set as a foreground candidate, and it is determined whether the pixel is a pixel of a second foreground region through comparison with a threshold value, as described above.

For example, when the luminance of the pixel to be inspected (I$^r$(x,y)) changes to "75" for a short period of time and is then restored to its original state, there is a high probability that the luminance of the pixel to be inspected (I$^r$(x,y)) will change to be similar to the luminance of peripheral pixels. For example, when leaves of one move due to wind, there is a high probability that the luminance of the pixel to be inspected of any one leaf will change to the luminance of another leaf.

That is, when the luminance of the pixel to be inspected (I$^r$(x,y)) changes for a short period of time and is then restored to its original state, there is a high probability that the luminance of the pixel to be inspected (I$^r$(x,y)) will be located within a background section which is a section between the peripheral upper limit luminance (Neighbor$_{max}$) and the peripheral lower limit luminance (Neighbor$_{min}$).

Accordingly, while the luminance of the pixel to be inspected (I$^r$(x,y)) changes for a short period of time and is then restored to its original state, there is a low probability that the pixel to be inspected (I$^r$(x,y)) will be erroneously determined to be a foreground image. That is, a background image that changes for a short period of time and is then restored to its original state may be prevented from being erroneously determined as a foreground image.

As described above, according to the foreground determination method and the monitoring system according to an exemplary embodiment, it is determined whether the pixel to be inspected changes to the luminance of a foreground image, based on the luminance of a pixel to be inspected and a result of comparing the luminance of the pixel to a peripheral upper limit luminance and a peripheral lower limit luminance.

For example, when the luminance of the pixel to be inspected is higher than the peripheral upper limit luminance or is lower than the peripheral lower limit luminance, it is determined that the pixel to be inspected corresponds to a second foreground region.

Hereinafter, referring to FIGS. 6 and 7, the motion determiner 140 that removes a dynamic background based on a pixel-based foreground region and a region-based foreground region to determine a moving object will be described.

Figure 6:
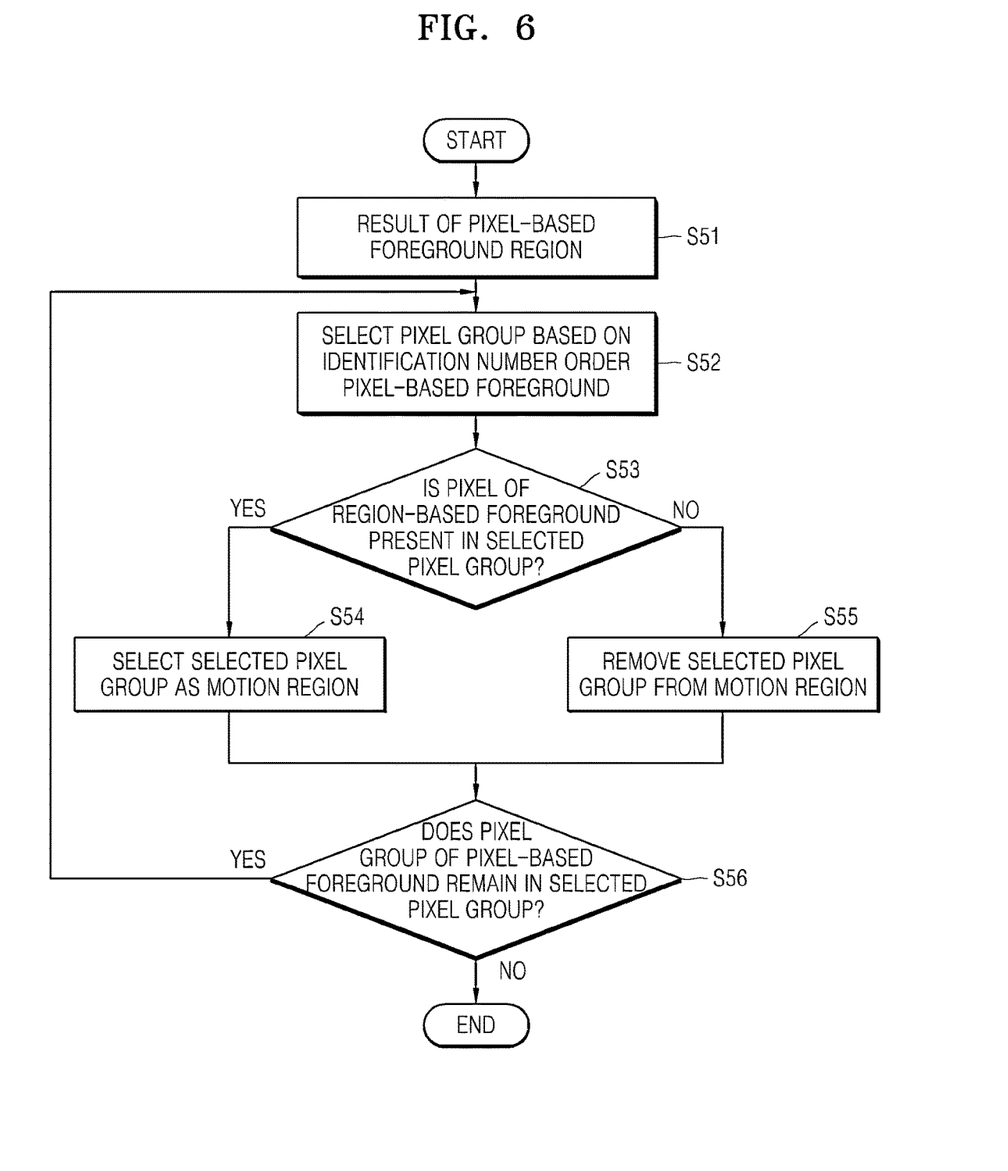
FIG. 6 is a flowchart illustrating a method of detecting a final moving object according to an exemplary embodiment.

FIG. 6 is a flowchart illustrating a method of detecting a final moving object according to an exemplary embodiment.

FIG. 7 is a diagram illustrating a method of detecting a final moving object by a combination of pixel-based detection and region-based detection.

Referring to FIG. 6, first, pixels corresponding to a pixel-based foreground, which is a result of detection performed by the pixel-based detector 120, are obtained (operation S51).

Next, a pixel group is selected in an identification number order in the pixel-based foreground (operation S52). Referring to FIG. 7, it is seen that foreground pixels detected by the pixel-based detector 120 are classified into three blobs, that is, pixel groups. That is, in an image (a) of FIG. 7, pixel groups having identification numbers of ID1, ID2, and ID3 are present. The motion determiner 140 selects the pixel groups according to the order of the respective identification numbers. For example, in the example regarding the image (a) of FIG. 7, the motion determiner 140 first selects the pixel group corresponding to the blob indicated by ID1.

Next, the motion determiner 140 determines whether pixels of a region-based foreground are present in the selected pixel group (operation S53). When the pixels of the region-based foreground are present in the selected pixel group, the selected pixel group is selected as a moving object (operation S54), and when there is no pixel of the region-based foreground, the selected pixel group is removed from the moving object (operation S55).

An image (b) of FIG. 7 shows pixels corresponding to a region-based foreground detected by the region-based detector 130. Referring to the images (a) and (b) of FIG. 7, the pixel group indicated by ID1 does not include pixels corresponding to the region-based foreground of the image (b) of FIG. 7. Accordingly, it may be seen that the pixel group indicated by ID1 does not include a pixel of the region-based foreground, and thus the selected pixel group of ID1 is removed from a motion region.

Finally, it is determined whether a pixel group of the pixel-based foreground remains (operation S56). If a pixel group remains, the method returns to operation S52, and if not, the motion detection is terminated In the example of FIG. 7, since the pixel groups of ID2 and ID3 remain, the method returns to operation S52, and the motion detection is continued. Since pixels corresponding to the region-based foreground of the image (b) of FIG. 7 are not included in the pixel group indicated by ID2, the selected pixel group indicated by ID2 is excluded from the motion region. Finally, B1s, which are pixels corresponding to the region-based foreground of the image (b) of FIG. 7, are included in the pixel group indicated by ID3, and the selected pixel group of ID3 is selected as a moving object. Since there is no more remaining pixel group of the pixel-based foreground, the motion detection is terminated.

Figure 8:
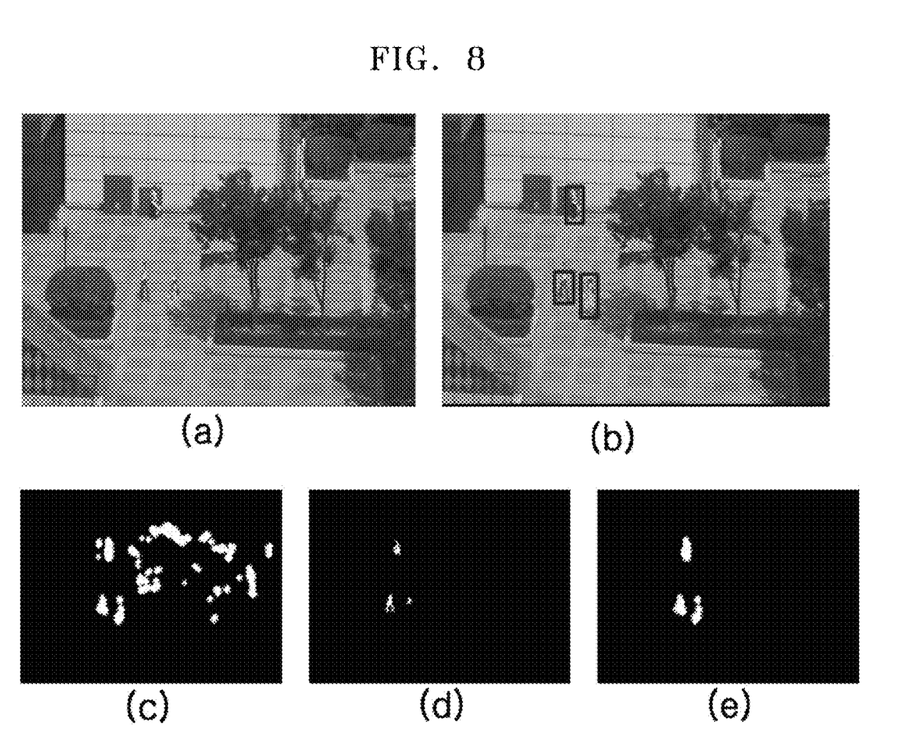
FIG. 8 illustrates results of real motion detection according to an exemplary embodiment.

FIG. 8 illustrates results of real motion detection according to an exemplary embodiment.

(a) of FIG. 8 is an original input image in which trees of a background move significantly due to strong wind, and (b) of FIG. 8 shows a result of motion detection of the corresponding image using the motion detection method according to an exemplary embodiment. In more detail, (c) of FIG. 8 is an image in which a first foreground region detected by the pixel-based detector 120 is expressed in white, and all moving trees are selected as a foreground. (d) of FIG. 8 is an image in which a second foreground region detected by the region-based detector 130 is expressed in white. Finally, (e) of FIG. 8 is a final motion region that is determined by the motion determiner 140. As seen from the image (e) of FIG. 8, only a pixel group including pixels corresponding to white of the image (d) of FIG. 8, in white pixel groups of the image (c) of FIG. 8, is detected as the final motion region. Thus, if the final motion region is mapped with a real image as shown in the image (b) of FIG. 8, it is seen that only persons which are real foreground objects are selected.

As described above, according to the one or more of the above exemplary embodiments, a region of a moving object can be accurately obtained, and a motion detection method capable of excluding noise and a dynamic background can be provided.

The exemplary embodiments may be implemented in the form of a program command which may be performed through various computer components and may be recorded on a computer-readable recording medium. The computer-readable recording medium may include a program command, a data file, a data structure, and a combination thereof. The program command recorded on the computer-readable recording medium may be specially designed and configured for the exemplary embodiments or known to those skilled in the computer software field. Examples of the computer-readable recording medium may include hardware apparatuses specially configured to store and execute a program command, such as a magnetic medium such as a hard disk, a floppy disk and a magnetic tape, an optical recording medium such as a CD-ROM and a DVD, a magneto-optical medium such as a floptical disk, a ROM, a RAM and a flash memory. Examples of the program command include machine language code made by a compiler or high-level language code executed by a computer using an interpreter or the like. The hardware apparatus may be configured to be operated as one or more software modules in order to perform the process of the present disclosure, and vice versa.

The exemplary embodiments shown and described herein are illustrative are not intended to otherwise limit the scope of the inventive concept, as defined by the appended claims. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the exemplary embodiments unless the element is specifically described as "essential" or "critical." The use of the terms "a" and "an" and "the" and similar referents in the context of describing the exemplary embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The exemplary embodiments are not limited to the described order of the steps. The use of any and all examples, or exemplary language (e.g., "such as") provided herein, is intended merely to better illuminate the exemplary embodiments and does not pose a limitation on the scope of the inventive concept, as defined by the appended claims. Numerous modifications and adaptations will be readily apparent to those skilled in this art without departing from the spirit and scope of the inventive concept, as defined by the appended claims.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept, as defined by the appended claims.

What is claimed is:

1. A motion detection system comprising a processor, the processor implementing:
    a pixel-based detector that compares a previous frame and a present frame to extract pixels constituting a first foreground region;
    a region-based detector that determines a peripheral region centering around a pixel to be inspected, obtains a peripheral upper limit luminance and a peripheral lower limit luminance in accordance with a maximum luminance and a minimum luminance in the peripheral region, and extracts a second foreground region based on comparison of a luminance of the pixel to be inspected to the peripheral upper limit luminance and the peripheral lower limit luminance; and
    a motion determiner that detects a final motion region that comprises pixels belonging to both the first foreground region and the second foreground region,
    wherein the region-based detector extracts the second foreground region independently from an extracting of the pixel-based detector before the motion determiner detects the final motion region,
    wherein the first foreground region comprises a plurality of pixel groups, and the final motion region comprises pixels included in one of the plurality of pixel groups of the first foreground region, the one of the plurality of pixel groups of the first foreground region overlapping with the second foreground region,
    wherein the pixel-based detector comprises:
        a first foreground detector that detects the first foreground region by using a background difference image technique; and
        a labeler that groups pixels which are adjacent to each other among the pixels constituting the first foreground region into a plurality of pixel groups and assign an identification number to each of the plurality of pixel group.

2. The motion detection system of claim 1, wherein the motion determiner selects the pixel group among the plurality of pixel groups of the first foreground region based on an identification number and determines whether pixels corresponding to the second foreground region are included in the selected pixel group.

3. The motion detection system of claim 2, wherein the pixel groups of the first foreground region comprise at least one pixel group in which adjacent pixels of the first foreground region are grouped and assigned an identification number.

4. The motion detection system of claim 2, wherein the motion determiner removes a pixel group among the plurality of pixel groups of the first foreground region not comprising pixels corresponding to the second foreground region from the final motion region.

5. The motion detection system of claim 1, wherein the pixel-based detector further comprises:
    a noise remover that removes noise formed by a pixel group in which a number of pixels is equal to or less than a reference number, among the plurality of pixel groups, by applying a filter to the first foreground region; and
    an expander that expands a size of a foreground of the first foreground region through morphology dilation.

6. The motion detection system of claim 1,
    wherein in response to a value of the luminance of the pixel to be inspected being between the peripheral upper limit luminance and the peripheral lower limit luminance, the pixel to be inspected is determined to be a background pixel, and
    wherein in response to the value of the luminance of the pixel to be inspected exceeding a threshold value, the pixel to be inspected is determined to be a pixel of the second foreground region.

7. A motion detection method comprising:
    determining a first foreground region that comprises pixels extracted from an image by comparing a previous frame and a present frame of the image;
    determining a peripheral region centering around a pixel to be inspected;
    obtaining a peripheral upper limit luminance and a peripheral lower limit luminance in accordance with a maximum luminance and a minimum luminance in the peripheral region;
    extracting a second foreground region based on comparison of a luminance of the pixel to be inspected to the peripheral upper limit luminance and the peripheral lower limit luminance; and
    detecting a final motion region that comprises pixels belonging to both the first foreground region and the second foreground region,
    wherein the extracting comprises extracting the second foreground region independently from the determining of the first foreground region before the detecting of the final motion region, and
    wherein the first foreground region comprises a plurality of pixel groups, and the final motion region comprises pixels included in one of the plurality of pixel groups of the first foreground region, the one of the plurality of pixel groups of the first foreground region overlapping with the second foreground region,
    wherein the determining the first foreground region comprises:
        detecting the first foreground region using a background difference image technique, and
        grouping pixels which are adjacent to each other among the pixels constituting the first foreground region into a plurality of pixel groups and assigning an identification number to each of the plurality of pixel groups.

8. The motion detection method of claim 7, wherein the detecting of the final motion region comprises selecting the pixel group among the plurality of pixel groups of the first foreground region based on an identification number, and determining whether pixels corresponding to the second foreground region are included in the selected pixel group.

9. The motion detection method of claim 8, wherein the pixel groups of the first foreground region are configured as at least one pixel group in which adjacent pixels of the first foreground region are grouped and assigned an identification number.

10. The motion detection method of claim 8, wherein the detecting of the pixel group comprises removing a pixel group among the pixel groups of the first foreground region not comprising pixels corresponding to the second foreground region from the final motion region.

11. The motion detection method of claim 7, wherein the determining the first foreground region further comprises:
    removing noise formed by a pixel group in which a number of pixels is equal to or less than a reference number, among the plurality of pixel groups, by applying a filter to the first foreground region, and
    expanding a size of a foreground of the first foreground region through morphology dilation.

12. The motion detection method of claim 7, wherein the extracting the second foreground region comprises, determining the pixel to be inspected as a background pixel in response to a value of the luminance of the pixel to be inspected being between the peripheral upper limit luminance and the peripheral lower limit luminance, and determining the pixel to be inspected as a pixel of the second foreground region in response to the value of the luminance of the pixel to be inspected exceeding a threshold value.

13. A non-transitory computer readable medium having recorded thereon a program, which when executed by a computer, causes the computer to execute a method comprising:
    determining a first foreground region that comprises pixels extracted from an image by comparing a previous frame and a present frame of the image;
    determining a peripheral region centering around a pixel to be inspected;
    obtaining a peripheral upper limit luminance and a peripheral lower limit luminance in accordance with a maximum luminance and a minimum luminance in the peripheral region;
    extracting a second foreground region based on comparison of a luminance of the pixel to be inspected to the peripheral upper limit luminance and the peripheral lower limit luminance; and
    detecting a final motion region that comprises pixels belonging to both the first foreground region and the second foreground region,
    wherein the extracting comprises extracting the second foreground region independently from the determining of the first foreground region before the detecting of the final motion region,
    wherein the first foreground region comprises a plurality of pixel groups, and the final motion region comprises pixels included in one of the plurality of pixel groups of the first foreground region, the one of the plurality of pixel groups of the first foreground region overlapping with the second foreground region, and
    wherein the determining the first foreground region comprises:
        detecting the first foreground region using a background difference image technique, and
        grouping pixels which are adjacent to each other among the pixels constituting the first foreground region into a plurality of pixel groups and assigning an identification number to each of the plurality of pixel groups.

14. The non-transitory computer readable medium of claim 13, wherein the comparing the previous frame and the present frame comprises using a background difference image technique.

* * * * *